United States Patent [19]

Speck

[11] Patent Number: 4,854,114

[45] Date of Patent: Aug. 8, 1989

[54] SECTIONAL SICKLE BAR

[75] Inventor: Cleo T. Speck, Indianola, Iowa

[73] Assignee: Herschel Corporation, Indianola, Iowa

[21] Appl. No.: 176,094

[22] Filed: Mar. 31, 1988

[51] Int. Cl.⁴ .......................................... A01D 34/02
[52] U.S. Cl. ...................................... 56/296; 56/300; 411/424; 411/169
[58] Field of Search ................. 56/296, 297, 300–303; 411/424, 169, 399, 973

[56] References Cited

U.S. PATENT DOCUMENTS

| | | | |
|---|---|---|---|
| 409,696 | 8/1889 | Motherwell | 411/424 |
| 1,233,950 | 7/1917 | Aidlotte | 56/296 |
| 1,340,868 | 5/1920 | Aidlotte | 56/296 |
| 1,570,645 | 1/1926 | Roche | 411/424 |
| 3,561,203 | 4/1971 | Hurlburt | 56/296 |
| 3,664,103 | 5/1972 | McNair | 56/298 |
| 3,941,003 | 3/1976 | Garrison et al. | 56/296 |

FOREIGN PATENT DOCUMENTS 2504617 10/1982 France ................. 411/169
1593545 7/1981 United Kingdom ........... 411/69

OTHER PUBLICATIONS

Crary Company brochure for Split Sickle Bar and Self Sharp Sickle, Crary Company, Fargo, N.D. (published on a date unknown prior to Aug. 17, 1987).

Primary Examiner—John Weiss
Attorney, Agent, or Firm—Merchant, Gould, Smith, Edell, Welter & Schmidt

[57] ABSTRACT

A sectional sickle bar is provided. The sickle bar includes a plurality of elongated bar segments and means for releasably joining adjacent joining ends of adjacent bar segments. The joining means includes a special section and at least three fasteners. Each fastener includes a bolt, a nut and reciprocal thread means for screwing the nut onto the bolt. Adjacent joining ends of adjacent bar segments are joined together by the fasteners and the special section to form a lap joint. In a preferred embodiment, a special fastener having an oblong shank is provided. Preferably, the fastener has an offset threaded end portion for receiving a reciprocally threaded nut.

14 Claims, 3 Drawing Sheets

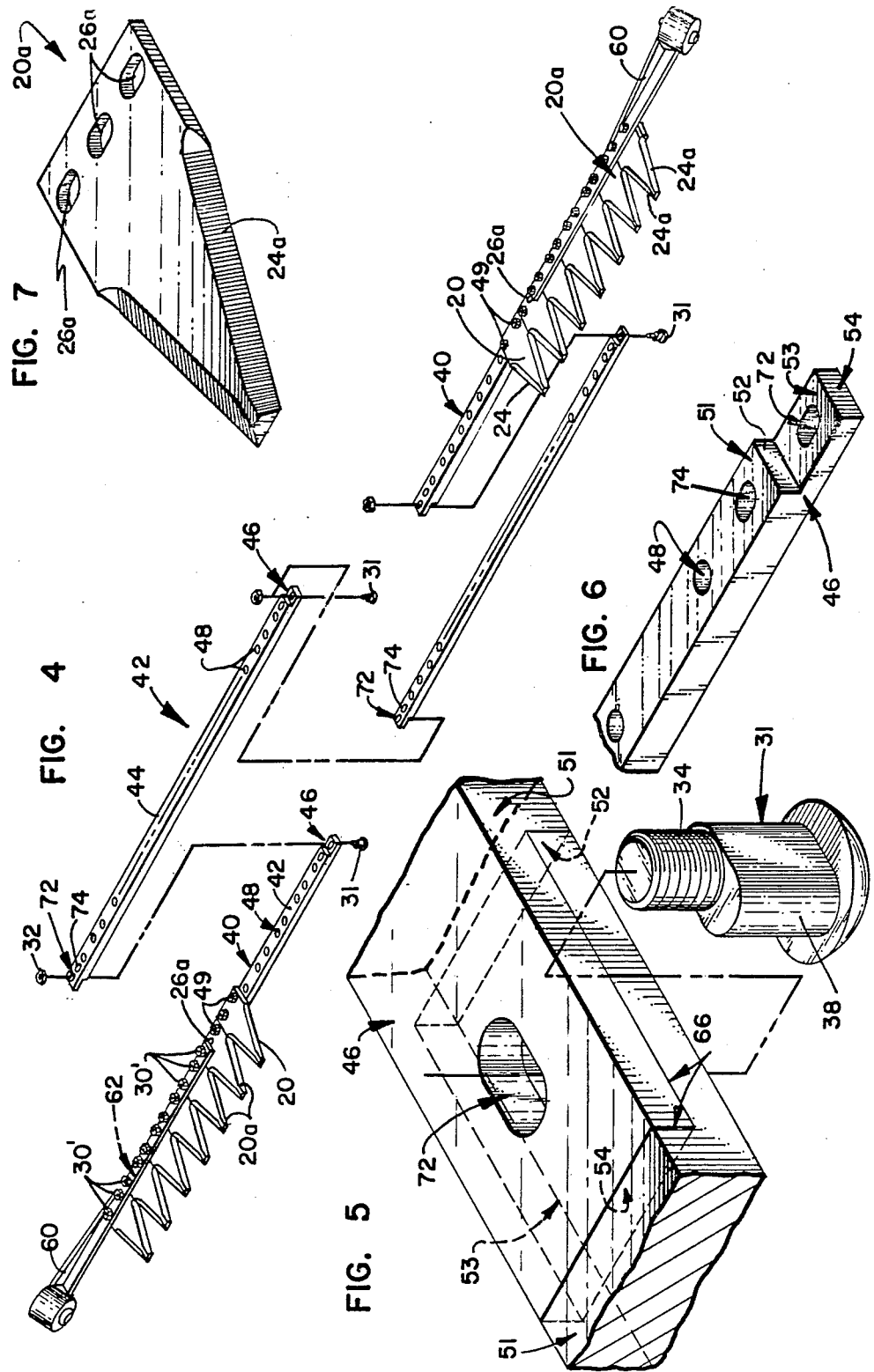

SECTIONAL SICKLE BAR

FIELD OF THE INVENTION

The present invention relates to a sectional sickle bar or knifeback for use with a combine or other crop cutting apparatus employed to cut field crops as a step in harvesting crops.

BACKGROUND OF THE INVENTION

Combines have been used to cut field crops such as corn, soybeans, wheat, other small grains and the like for many years. Since the end of World War II, the equipment used for mechanized farming has been steadily developing to meet the advancing needs of farmers. As field acreages have been increased, larger and larger combines have been designed and manufactured to provide farmers with combines having greater harvesting capacity.

Combines presently in use generally require sickle bars or knifebacks which range in length from about 5 to about 30 feet. The sickle bars support cutting sections or blades which reciprocate back and forth across the front of the combine within a header, thereby cutting crops as they enter the header.

Unfortunately, although combines with longer sickle bars generally provide for greater harvesting efficiency, longer sickle bars are difficult to handle. The longer they are, the more difficult they are to handle during manufacturing, storing and shipping. Sickle bars having lengths greater than about 6-9 feet are difficult to store because the longer lengths make them hard to move in and out of storage areas. Furthermore, it is difficult for a single individual to handle them. For instance, if a 6 foot sickle bar was being moved from one place to another, a single individual could easily move it without assistance. If a 30 foot sickle bar needs to be moved from one place to another, however, the size of the rooms and the angles of the doors through which the sickle bar must pass, must be such that they are able to accommodate a 30 foot sickle bar. Furthermore, moving such a long object would almost certainly require the efforts of more than one individual.

Handling problems also make it very difficult to manufacture, display and ship the larger sickle bars. Indeed, virtually all common carriers have limits on the size of the items which they will agree to ship. For instance, United Parcel Service (UPS) will not ship items having a length of greater than 108 inches (9 feet). Therefore, if a manufacturer is to ship a sickle bar having a length greater than 9 feet, special arrangements must be made. Because sickle bars having greater than normal length are also frequently damaged during shipping and storage, these arrangements must receive careful consideration.

It will be appreciated, therefore, that although longer sickle bars allow farmers to harvest their crops with greater efficiency with respect to time, the need for longer sickle bars increases the costs associated with all phases of handling such items. For this reason, a need exists for a sickle bar that, while suitable for use in the larger combines, can be handled in a more cost effective manner. It will be appreciated, however, that this need must be met without diminishing the quality of the sickle bars being used such that other inefficiencies are created.

The present invention addresses these and other problems associated with the production and handling of sickle bars for use with a variety of combines requiring sickle bars of various lengths. The present invention also offers other advantages over the prior art, and solves other problems associated therewith.

SUMMARY OF THE INVENTION

In accordance with the present invention, a sectional sickle bar is provided. The sickle bar comprises a plurality of the elongated bar segments and means for releaseably joining adjacent joining ends of adjacent bar segments. Each of the bar segments have a center and at least one joining end adjacent to the center. Each of the joining ends have a bar portion, a step portion, an end portion and a shoulder portion. The bar portion separates and is adjacent to both the center and the shoulder portion. The step portion separates and is adjacent to both the shoulder portion and the end portion. The joining means include a special section and at least three fasteners. Each fastener includes a bolt, a nut, and reciprocal thread means for screwing the nut onto the bolt. The special section has an upper surface, a lower surface and at least three fastener receiving section openings extending through the section. Each of the joining ends have a fastener receiving bar portion opening and a fastener receiving step portion opening. A lap joint is formed when joining ends of two bar segments are joined together. The lap joint includes adjacent joining ends of adjacent bar segments joined together by the joining means such that the adjacent bar segments are substantially in alignment with one another and such that the respective step portions of the adjacent joining ends overlap one another. Each of the section openings are individually aligned either with one of the bar portion openings, or simultaneously with the step portion openings of the overlapping step portions of said adjacent joining ends. The lap joint is fastened together by the fasteners, each of which individually pass through one of the section openings and one of the bar portion openings or both of the step portion openings of the adjacent joining ends. Only one fastener passes through the step portions of the adjacent joining ends. The nut of each fastener is tightened down on the bolt of each fastener such that the section is held firmly in place upon adjacent bar segments. Preferably, sufficient compression is created that the lap joint exhibits a high resistance to movement between the adjacent step portions and between the bar portions of the adjacent joining ends and the special section. Preferably, the bolt includes an oblong shank having a smooth outer surface and each of the openings is an oblong opening which reciprocates the shape of the oblong shank such that the shank can be received by each of the oblong openings. Preferably, the greatest lengths of the oblong openings are oriented in alignment with one another and are aligned in parallel with the greatest length of the bar segments. Preferably, the section includes edge means for cutting crops. In other preferred embodiments, the end portions of adjacent joining ends abut against the respective shoulder portions of adjacent joining ends when adjacent joining ends are releaseably fastened together in a lap joint of the present invention.

As used in the present specification, the following terms have the following meanings. An oblong shank means a shank having an oblong cross-section. A lap joint is a joint between two adjacent bar segments, including a special section which overlaps the joints between joining ends of a adjacent bar segments.

The present invention provides a sectional sickle bar or knifeback which can be easily manufactured, handled, shipped, and stored. It is easily assembled with the use of directions which can be provided by the manufacturer, and it provides a particularly strong joint which will resist failure for long periods of heavy use.

The bar segments of the present invention are preferably made in lengths which are about 9 feet or less, preferably about 8 feet or less, more preferably about 6 feet or less. A sickle bar that is manufactured in, for example, 6 foot segments, would address many of the problems associated with sickle bars having longer lengths. With regard to handling, one person could handle a bundle of 6 foot segments, while two or possibly even three would be required to manipulate a 30 foot sickle bar. The same is true with respect to shipping. Because the sickle bars having larger lengths are so difficult to handle, they are quite frequently damaged. In fact, the Applicants have made note that the number of sickle bars returned as damaged in transit, increases roughly proportionally as the length sickle bar increases. Also, because the various parcel delivery services are generally unwilling to accept a bundle which is longer than 6 feet long, it will be appreciated that a sectional sickle bar which can be assembled on site to provide a sickle bar of up to 30 feet long will provide a great advantage over the prior art.

Designing and constructing a sectional sickle bar, is not entirely straight forward. It is extremely important that the lap joint for joining or splicing the sickle bar provide for great strength so that the sectional sickle bar can withstand alternate tension and compression along the length of the sickle bar during continuous use. The Applicants found that it was most difficult to design a sectional sickle bar which could stand up to the continuous tension and compression expected when a sickle bar reciprocates rapidly across the front of a combine.

In order to provide a sickle bar which could withstand such use, Applicants designed the present invention. They found that, as compared with other possible designs, the present invention provided a lap joint which is extremely resistant to failure because the hardened heel of the special section becomes a load bearing member within the lap joint. In the most preferred embodiment the oblong shank of the bolts extend at least about halfway into the oblong section openings. This allows the tensile forces across the lap joint to be redistributed through multiple flow lines, providing a tensile strength that meets the need and provides a sectional sickle bar which is nearly as strong as an unaltered sickle bar.

The preferred provision for the oblong shank of the fastener also minimizes the material which must be removed from the special section for the special section fastener openings, as compared to the openings which would be required for normal bolts having shanks with round cross-sections. The reduced size of the openings permitted by the oblong openings, allows the special section to have greater strength to resist the sheer forces encountered across the lap joint during use.

In an alternate embodiment the fasteners have threaded end portions which are preferably offset with respect to the center of the oblong shank. This enables the same bolt to be used for splice joints in the sectional sickle and also for attaching the reciprocating sickle bar to any number of two different standard mating members for attachment to a "wobble box" or other reciprocating drive means for driving the sickle bar back and forth across the front of the combine. The offset is necessary because two different hole spacings are common and accepted as standard in the industry. These standard spacings are either two inches or two and one-sixteenth inch from center to center between the openings in the mating members which correspond to the openings in the sections and the sickle bar below the mating member. In order to provide for a high degree of interchangeability with products already in use by the consumer, it is desirable to provide a method of attaching a sickle bar to mating members having either spacing. The threaded end portion of the oblong fasteners are preferably offset about 1/64 of an inch. This offset allows the threaded end portion to mesh with the two-inch standard spacing when the offset is turned so that the centers of the portions are closest together. Conversely, when the centers of the threaded portions are furthest apart, or when the offset are turned outward, the spacing between the centers of the threaded end portions is about two and one-sixteenth inch and the spacing meets the two and one-sixteenth inch standard spacing.

The above described features and advantages along with various other advantages and features of novelty are pointed out with particularity in the claims of the present application. However, for a better understanding of the invention, its advantages, and objects attained by its use, reference should be made to the drawings which form a further part of the present application and to the accompanying descriptive matter in which there is illustrated and described preferred embodiments of the present invention.

BRIEF DESCRIPTION OF THE DRAWINGS

In the drawings, in which like and primed reference numerals and letters indicate corresponding parts of preferred embodiments of the present invention throughout the several views.

FIG. 4 is an exploded perspective view of a sectional sickle bar with attachments;

FIG. 5 is an enlarged perspective view of adjacent joining ends of two bar segments with overlapping step portions and aligned oblong step portion opening which can receive the fastener having an oblong shank as shown;

FIG. 6 is a perspective view of an enlarged portion of the sickle bar shown in FIG. 4;

FIG. 7 is a perspective view of a preferred special section having cutting edges;

DETAILED DESCRIPTION OF THE PREFERRED EMBODIMENTS

Figure 1:
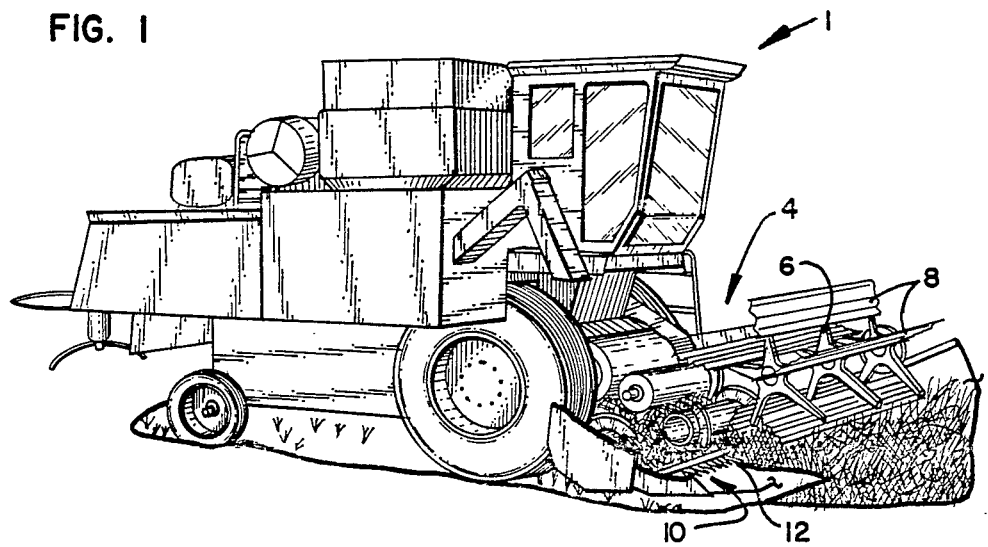
FIG. 1 is a perspective view of a combine employing a sickle bar inside the header to cut crops.

Referring to the drawings, FIG. 1 shows a combine 1 for cutting field crops such as soybeans, wheat, other small grains, and the like. The crops are cut by the header 4 in front of the combine 1 as it moves forward. The header 4 includes a reel 6 having five reel bats 8 which turns clockwise on its axis to bring the crops into the header 4 as the combine 1 progresses forward across a field. As the reel bats 8 bring the upper parts of the crops into the header, the stems or other portions of the crops near the ground are cut by the cutting head 10 which runs horizontally across the lower portion of the header 4. Once the crops are cut by the cutting head 10, they are passed through the header 4 and into the combine 1 for further processing. Various headers 4 may be used depending upon the particular crop and the spacing of the crops.

Figure 3:
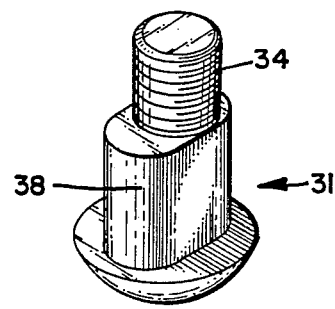
FIG. 3 is a perspective view of a special fastener having an oblong shank and an offset threaded end portion.
Figure 2:
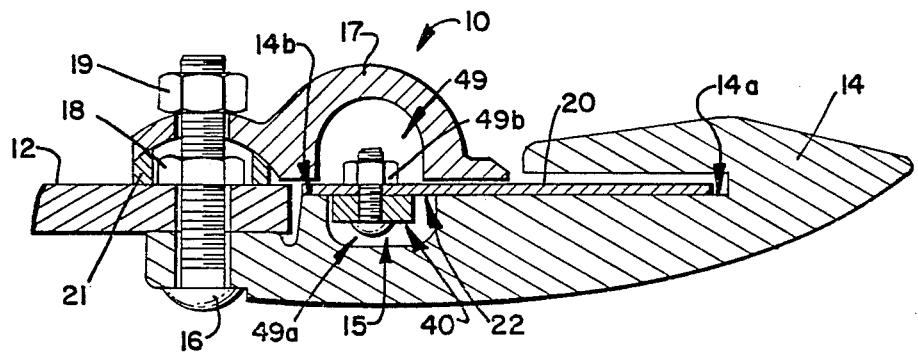
FIG. 2 is a cross-sectional view of a portion of the cutting head which runs horizontally across the front of the header shown in FIG. 1.

A cross-sectional view of a cutting head 10 is shown in FIG. 2. A cutter bar 12 which runs horizontally across the width of the header 4, and is attached thereto, provides a supporting structure for the cutting head 10. A series of guard points 14 are attached to the cutter bar 12 with cutter bar bolts 16 which are initially attached using jam nuts 18 which are threaded onto the cutter bar bolts 16 and hold the guard points 14 on the cutter bar 12. In the preferred embodiment a series of guard points 14 are attached side by side at even intervals along the length of the cutter bar 12. This series of guard points 14 provide support for cutting sections 20 and special sections 20a which are fastened to the sickle bar 40. The cutting sections 20 are fastened to the sickle bar 40 with common center section fasteners 49 having a common bolt 49a and common nut 49b. The special sections 20a are fastened to the sickle bar 40 with special section fasteners 30. A special section fastener 30 includes a special fastener bolt 31 and a special fastener nut 32. The special nut 32 and the special bolt 31 are reciprocally threaded so as to receive one another. Preferably, the special nut 32 receives a threaded end portion 34 of the special bolt 31 and the special bolt 31 has an oblong shank 38 which is preferably smooth as shown in FIG. 3.

Referring now also to FIG. 4, the cutting sections 20 are preferably attached side by side on the sickle bar 40 which reciprocates back and forth across the front of the header 4 while the cutting sections 20 slide over front and back guard point sliding surfaces 14a and 14b which support the underside 22 of each of the cutting sections 20. Each cutting section 20 has cutting edges 24. The sickle bar 40 reciprocates back and forth freely in a reciprocating space or channel 15 which is provided in each guard point 14 between the front and back sliding surfaces 14a and 14b. In order to prevent the sickle bar 40 with its attached cutting sections 20 from coming out of the reciprocating space 15 provided in the guard points 14, a hold-down clip 17 is provided. The hold down clip 17 is bolted down onto a clip pivot 21 which is placed between the cutter bar 12 and the hold-down clip 17 where a hold-down nut 19 fastens the hold-down clip 17 to the cutter bar 12. The clip pivot 21 provides sufficient spacing between the hold-down clip 17 and the cutter bar 12 so that the hold-down clip 17 does not interfere with the reciprocating sickle bar 40 or its attached cutting sections 20 as they reciprocate back and forth. The sectional sickle bar 40 contains a plurality of bar segments 42. Each bar segment 42 has a center 44 and at least one joining end 46. The centers 44 of the bar segments 42 have a series of center fastener openings 48 which receive common center section fasteners 49 which fasten cutting sections 20 to the sickle bar 40.

Referring now also to FIGS. 5, 6, 7 and 8, the joining ends 46 of each bar segment 42 include a bar portion 51, a shoulder portion 52 adjacent to the bar portion 51, a step portion 53 adjacent to the shoulder portion 52, and an end portion 54 adjacent to the step portion 53. The joining end 46 is stepped so that adjacent joining ends 46 may be joined such that their step portions 53 overlap, and, preferably, so that the respective end portions 54 abut against the respective shoulder portions 52 of each opposite adjacent joining end 46 as shown in FIG. 5. The bar segments 42 can be turned end for end without changing the relationship between adjacent joining ends 46. When the end portion 54 of one joining end 46 is brought up against the shoulder portion 52 of an adjacent joining end 46 so as to abut thereagainst, the step portions 53 of the two adjacent joining ends 46 overlap, forming an end joint 66 which includes the space between the abutting surfaces of the adjacent joining ends 46.

Two bar segments 42 are joined together by bringing joining ends 46 of each segment 42 together as shown in FIG. 5. A lap joint 70 is then assembled by passing single special fastener bolts 31 through bar portion openings 74 in each adjacent joining end 46 and through the aligned step portion openings 72 of the step portions of the two adjacent joining ends 46. A special section 20a having three special section fastener openings 26a can then be fastened down on the sickle bar 40 by placing it on the sickle bar 40 such that the three special section fastener openings 26a are aligned with and receive the three special fastener bolts 31 which were passed through the adjacent joining ends 46. Then, special fastener nuts 32 can be screwed onto all three bolts 31 such that the special section 20a is held tightly down upon the sickle bar 40, thereby forming the lap joint 70. It will be appreciated that any successful order of assembly of the parts of the lap joint 70 may be used to assemble same. The lap joint 70 includes two adjacent joining ends 46, a special section 20a, and three special fasteners 30.

In a preferred embodiment, the special fastener bolt 31 has an oblong shank 38 and a threaded end portion 34 which is reciprocally threaded such that it can receive the fastener nut 32 which is also threaded. In this embodiment, when the lap joint 70 is fully assembled, the oblong shank 38 extends at least about half-way to about three-quarters of the way through the fastener receiving special section fastener openings 26a in the special section 20a.

Figure 8:
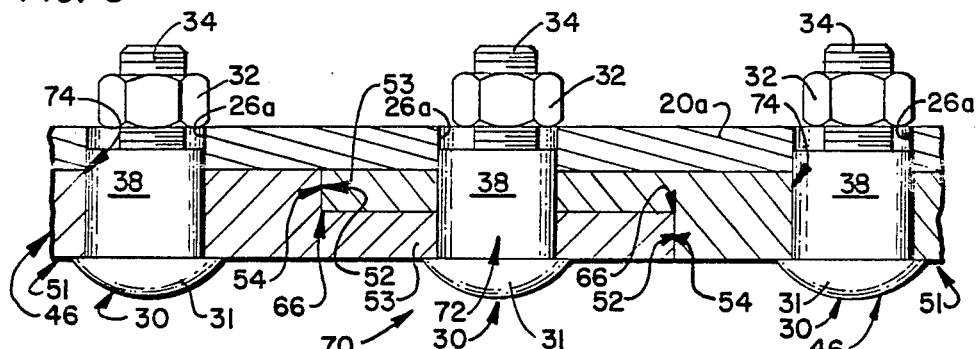
FIG. 8 is a cross-sectional view of two adjacent joining ends which have been spliced together with a special section in accord with the present invention.

FIG. 8 shows a cross-section of a portion of an assembled lap joint 70 wherein the special section fasteners 30 bind a special section 20a, preferably including cutting edges 24a, to the sickle bar 40 such that the special section 20a straddles the area of overlap between the two adjacent joining ends 46 and straddles the end joint 66 between the adjacent joining ends 46. Only one special fastener 30 passes through the oblong step portion fastener openings 72 in each of the overlapping step portions 53, and helps to bind the special section 20a to the sickle bar 40. Two other special fasteners 30 pass through the bar portion fastener opening 74 of the two adjacent joining ends 46, respectively, and through the two outer most section fastener openings 26a in the special section 20a.

In order to be successful in the marketplace, the spliced sickle concept, which includes the sectional sickle bar 40, must provide a marketable product. To be marketable, the product needs to be reliable. The present concept provides a sickle bar 40 or knifeback 40 (the common member to which the individual sections 20 or 20a are fastened) which preferably has a cross-section of 0.25 inch in height and a width of 0.75 inch. Knifeback 40 having other commonly used cross-sections may also be used (e.g. 0.25 by 0.875, 0.25 by 1.00, 0.1875 by 1.25 and any other size used in the world market now or in the future).

During use, the sickle bar 40 is loaded in a direction parallel to its length, in a cyclic manner of tension and compression. The lap joint 70 must resist the forces generated by the high rate of cyclic operation and the load imposed during cutting of the various crops which utilize cutterbar harvesting mechanisms. Allowances also need to be considered for obstructions which may occasionally enter the harvesting mechanism, including the occasional overloading with crop material.

Three distinct paths are utilized to resist and to transfer forces across the lap joint 70. These are the special fasteners 30, the special section 20a, and the friction resulting from the clamp load or compression imposed by the fasteners 30. No single path is believed to be satisfactory by itself. The combination of all three, however, provide a strong splice mechanism or lap joint 70 which can withstand long term use.

The special fastener 30 preferably includes a grade #8, truss headed bolt 31 having an oblong shank 38 and a threaded end portion 34 utilizing a #12-24 UNC thread. In a preferred embodiment the threaded end portion 34 can be offset. The threaded end portion 34 can be positioned concentrically about the centerline of the axis parallel to the length of the fastener. Optionally, the position of the threaded portion 34 is offset from the centerline previously described 0.03125 inch along a centerline that coincides with the oblong cross-section of the fastener shank 38 having the greatest length.

The oblong shank 38 of the fastener 30 addresses several problems caused by the shear forces encountered within joints fastened with conventional thread fasteners. The unconventional use of a threaded fastener to resist shear at the shear line of the joint presents several problems. First, the solid cross-section left to resist shear after threading is greatly reduced. In the case of a #12-24 thread the solid core is reduced approxiamtely 43% as compared to the cross-sectional area of an unthreaded rod the same size (e.g. 0.216 inch diameter).

Second, the contact between the fastener and the two members placing the fastener in shear, is a line contact where the crest of the thread contacts the walls of the opening through which the fastener passes. This line contact, as opposed to full surface contact which might otherwise be expected, facilitates the embedding of the sharp thread crest into the opening walls and thus helps provide for movement within the joint, leading to a combination of factors which can cause point failure of the joint.

Third, the holes which are to receive threaded fasteners are customarily oversized by some given standard to allow for manufacturing tolerance and interchangeability. This looseness contributes to poor fit between fastener and member which is a negative factor in resisting shear.

The special fastener 30 developed for the present invention addresses each of the problems. The greatest length of the oblong shank 38 is aligned with the length of the knifeback 40. Shear and the ability to resist shear is believed to be a function of the amount of material placed in a shear loading condition. Consequently, because the special fastener 30 has an oblong shank 38, and because the shear load is placed across (parallel to) the greatest length of the oblong shank 38, the oblong shank 38 provides the same load carrying ability of a round fastener having the same maximum diameter, but the opening 26a required in the section 20a is narrower. This allows the special section 20a to have more material to carry loads across the section 20a in a direction parallel to the greatest length of the oblong openings 26a. Furthermore, the oblong shank 38 is preferably smooth, thereby providing for contact between the fastener shank 38 and the walls of the openings 26a and 74. The size and finish of the special fastener 30 are carefully controlled so that the fit between the various parts is preferably held to a maximum tolerance of only a few thousandths of an inch.

The spliced sickle concept provides for the special section 20a to become a load carrying member of the lap joint 70. The following aspects of the present lap joint 70 provide for a splice joint which can withstand continual use. The special section 20a preferably has three oblong special section fastener openings 26a of a given size and location so as to be identical to the openings 72 and 74 of two adjacent joining ends 46 of the lap joint 70. The area across the heel 25a (rear portion) of the section is preferably heat treated. The heat treatment imparts an optimum strength characteristic to the heel 25a and this translates into optimum load carrying ability for the special section 20a.

The oblong shank 38 of the special fastener 30 is of such length that, when properly assembled, the oblong shank 38 will protrude from the knifeback 40 some given distance. Preferably, this distance will be greater than about 50-75% of the thickness of the mating section 20a, but never, under any circumstances, a distance that would allow the oblong shank 38 to protrude beyond the section 20a. When the lap joint 70 has been assembled, the special fasteners 30 on either side of the end joint 66 will fit snugly into the bar portion openings 74 of the adjacent joining ends 46. The special section 20a will be located over the area of the end joint 66 and fitted over the protruding upper portions of the oblong shanks 38 of the special fasteners 30. When special nuts 32 are fastened down on the special bolts 31, the clamping force of the fasteners 30 creates one of the multiple conduits for the resistance to and the transfer of force. The partial flow of force is from the knifeback 40, on one side of the end joint 66, to the oblong fastener shank 38, from the fastener shank 38, to the heel 25a of the special section 20a, across the section 20a, to the fastener shank 38 on the other side of the end joint 66, and finally, into the knifeback 40 on the other side of the end joint 66.

Once the lap joint 70 is assembled, the fasteners 30 exert a compressive effect upon the various members assembled upon the oblong fastener shanks 38. This compressive effect provides for the third path for the resistance to and the transfer of force in the lap joint 70. Any surface inherently has some coefficient of friction. The more tightly the respective surfaces are forced together, the greater the friction per unit area. The friction resulting from the compression caused by the three fasteners 30 employed in the preferred lap joint 70 of the present invention is apparent in the following locations. Foremost, and of the greatest importance, is the resistance to movement created by the compression of the two step portions 53 of the lap joint 70. These two areas typically have a somewhat rough surface after preparation, and therefore exhibit a high resistance to movement with respect to one another while under the compressive effect of the fasteners 30 which are preferably torqued or tightened such that the special section 20a is held firmly in place upon the adjacent bar segments 42 of the knifeback 40 of a lesser degree, but important nevertheless, is the friction created between the special section 20a and the bar portions 51 of knifeback 40 on either side of the end joint 66. Compression in this area creates a high resistance to movement between these parts.

The bar segments 42 can be any length which would be practical. Preferably, the bar segments 42 are about 4, 6, 8 or 9 feet long with additional lengths necessary to combine with multiples of those lengths to form assembled sectional sickle bars 40 of particular finished lengths. Finished lengths of any length can be formed. Preferably, the assembled sectional sickle bars 40 of the present invention have finished lengths of about 12, 13, 14, 15, 16, 18, 20, 22, 24 and 30 feet, most preferably about 16, 20, 24 and 30 feet.

The assembled sectional sickle bar 40 is attached to standard drive means for reciprocating a sickle bar 40 within a header 4. The standard drive means is harnessed by attaching the sickle bar 40 to a mating member 60 which is attached to a standard drive mechanism, preferably a "wobble-box", all of which is well known in the art.

Figure 9:
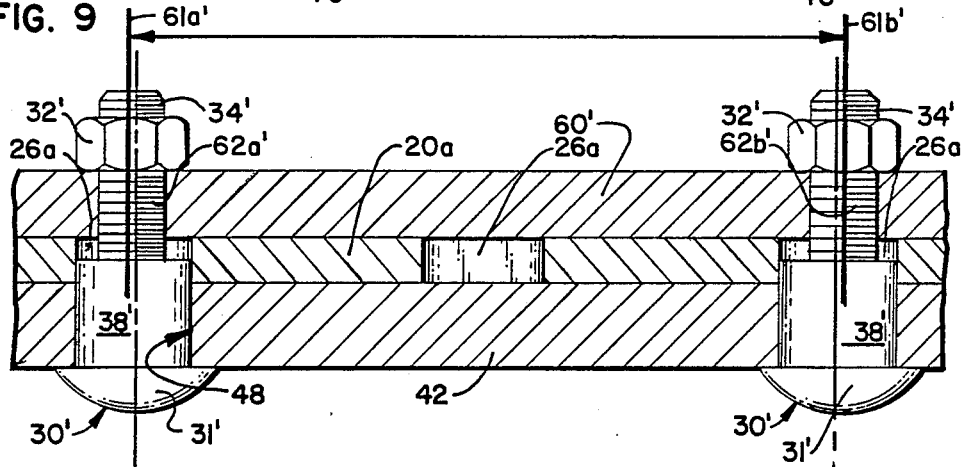
FIG. 9 is a cross-sectional view of a portion of a sickle bar and attachments where the sickle bar is attached to a mating member having two inch standard spacing.
Figure 10:
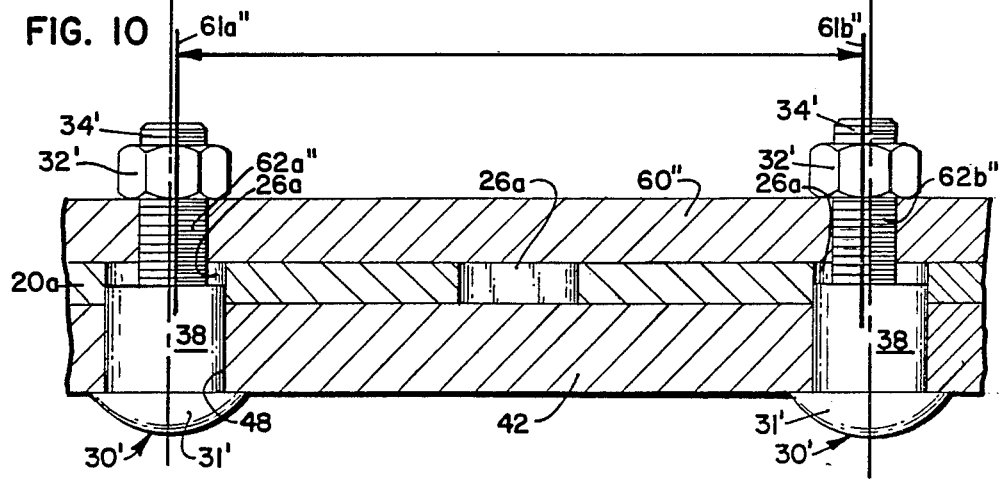
FIG. 10 is a cross-sectional view of a portion of a sickle bar and attachments showing the sickle bar attached to a mating member having two and one-sixteenth inch standard spacing.

Now referring also to FIGS. 9 and 10, the mating member 60 or drive mechanism header is attached to the sickle bar 40 or knifeback 40 by a series of special section fasteners 30' having slightly longer end portions 34' than the special section fasteners 30 used in the lap joints 70. The special fasteners 31' pass through the sickle bar 40, the special sections 20a fastened to the sickle bar 40, and the mating member 60 via a series of mating member openings 62. The special fastener bolts 31' which passes through the sickle bar 40, the special sections 20a and then the mating fastener 60, receive special fastener nuts 32' on a threaded end portion 34' which holds the mating member 60 in place on the surface created by the special sections 20a on top of the sickle bar 40. The thread end portions 34' of the special bolts 31' are slightly longer than the end portions 34 of the bolts 31 used to fasten the lap joints 70 so as to accommodate the extra thickness of the mating members 60. A mating member 60 can be provided at both ends of the sickle bar 40 so that the sickle bar 40 can be attached to both sides of the header 4, but in most cases the attachment is made on only one side of the header 4.

The spacing between the bolt receiving openings 62 in the mating members 60 of different standard equipment in the combine trade have two generally accepted center-to-center spacings. FIG. 9 shows a sickle bar 40 attached to a mating member 60' which has spacing of two and one-sixteenth inch between the centers 61a' and 61b' of the bolt receiving openings 62a' 62b' which are intended to receive the threaded end portions 34' of bolts 31' which pass through an individual special section 20a. On the other hand, in FIG. 10, a portion of a mating member 60" is shown which has spacing of two inches between the centers 61a' and 61b" of the bolt receiving openings 62a" and 62b" for receiving the threaded end portions 34' of similar bolts 31' which pass through an individual special cutting section 20a. In FIG. 9, the bolts 31' must be turned so that the threaded end portions 34' are offset as far away from one another as possible. In FIG. 10, the bolts 31' must be turned so that the threaded end portions 34' are offset inward and are therefore as close as possible to one another. By turning the offset threaded end portions 34' inward or outward, the position of the centers 61 of the threaded end portions 34' can be varied by about one-thirty-second of an inch and the distance between two threaded end portions 34' can be varied by about one-sixteenth of an inch. The use of the special fastener 30' having the offset threaded end portions 34' enables one to attach the same sickle bar 40 to alternate mating members 60' and 60" having spacing of about two inches or about two and one-sixteenth inches between the centers of the openings 62a and 62b for receiving the threaded end portions 34' of bolts 31' to fasten the mating members 60 to the sickle bars 40.

While certain representative embodiments of the present invention have been described herein for the purposes of illustration, it will be apparent to those skilled in the art that modifications therein may be made without departing from the spirit and scope of the present invention.

What is claimed is:

1. A sectional sickle bar comprising:
   (a) a plurality of elongated bar segments, each of said bar segments having a center and at least one joining end adjacent to said center; each of said joining ends having a bar portion, a step portion, an end portion, and a shoulder portion; said bar portion separating and being adjacent to both the center and the shoulder portion; said step portion separating and being adjacent to both the shoulder portion and the end portion; and
   (b) means for releasably joining adjacent joining ends of adjacent bar segments; said joining means including a special section and at least three fasteners; each fastener including a bolt, a nut, and a reciprocal thread means for screwing said nut into said bolt; said special section having an upper surface, a lower surface, and at least three oblong fastener receiving section openings extending through said section; each of said joining ends have an oblong fastener receiving bar portion opening and an oblong fastener receiving step portion opening; wherein a lap joint is formed when joining ends of two bar segments are joined together; said lap joint including adjacent joining ends of adjacent bar segments joined together by said joining means such that said adjacent bar segments are substantially in alignment with one another and such that the respective step portions of said adjacent joining ends overlap one another; wherein each of said oblong section openings are individually aligned either with one of said oblong bar portion openings, or simultaneously with the oblong step portion openings of the overlapping step portions of said adjacent ends; wherein the oblong bar portion openings and the oblong step portion openings of said adjacent joining ends are aligned such that the greatest length of the oblong openings are aligned with the greatest length of the bar segments; said bolt including a head portion having sufficient size dimensions so that it will not pass into or through any of the openings, a threaded end portion having a circular end portion cross-section, said end portion cross-section having a center, and an oblong shank portion interconnecting said head portion to said threaded end portion, said shank portion having a shank portion cross-section, said shank portion cross-section having a center, said shank portion having sufficient length to extend through an interface between fastener receiving openings when said bolt is received in at least two of said openings, said center of said end portion cross-section being offset from said center of said shank portion cross-section; said lap joint being fastened together by said fasteners, each of which individually pass through one of said section openings and one of said bar portion openings or both of said step portion openings of said adjacent joining ends; wherein only one fastener passes through said step portions of said adjacent joining ends; said nut of each fastener being tightened down onto said bolt of each fastener such that said section is held firmly in place upon said adjacent bar segments, sufficient compression being created that the lap joint exhibits a high resistance to movement between the adjacent step portions and between the bar portions of the adjacent joining ends and the special section.

2. The sectional sickle bar of claim 1, said special section including edge means for cutting crops.

3. The sectional sickle bar of claim 1, each of said bolts including an oblong shank having a smooth outer surface, and each of said openings being oblong openings which reciprocate the shape of said oblong shank such that said shank can be received by each of said oblong openings.

4. The sectional sickle bar of claim 3 wherein each of said oblong openings has an oblong cross-section having a greatest length along a centerline of said cross-section, and wherein the greatest lengths of said oblong openings are oriented in alignment with one another and are aligned in parallel with a greatest dimension of said bar segments.

5. The sectional sickle bar of claim 1 wherein said joining portions of each of said adjacent joining ends abut against the respective shoulder portions of said adjacent joining ends when joining ends of different bar segments are joined together in said lap joint.

6. The sectional sickle bar of claim 5, each of said nuts being tightened down upon the bolts of the fasteners passing through the two outer section fastener openings of each special section of each lap joint such that said section shares the load across said lap joint.

7. The sectional sickle bar of claim 1, said plurality of bar segments having a length of about six (6) feet or less.

8. A sectional sickle bar comprising:
(a) a plurality of elongated bar segments, each of said bar segments having a center and at least one joining end adjacent to said center; each of said joining ends having a bar portion, a step portion, and end portion, and a shoulder portion; said bar portion separating and being adjacent to both the center and the shoulder portion; said portion separating end being adjacent to both the shoulder portion and the end portion; and
(b) means for releasably joining adjacent joining ends of adjacent bar segments; said joining means including a special section and at least three fasteners; each fastener including a bolt, a nut, and reciprocal thread means for screwing said nut onto said reciprocal thread means for screwing said nut onto said bolt; said bolt having an oblong shank portion having a smooth outer surface and a nut receiving end portion; said special section having an upper surface, a lower surface, and at least three oblong fastener receiving section openings extending through said section; each of said joining ends having an oblong fastener receiving bar portion opening and an oblong fastener receiving step portion openings; wherein a lap joint is formed when joining ends of two bar segments are joined together; said lap joint including adjacent joining ends of adjacent bar segments joined together by said joining means such that said adjacent bar segments are substantially in alignment with one another and such that the respective step portions of said adjacent joining ends overlap one another; wherein each of said section openings are individually aligned either with one of said bar portion openings, or simultaneously with the step portion openings of the overlapping step portions of said adjacent joining ends; said lap joint being fastened together by said fasteners each of which individually pass through one of said section openings and one of said bar portion openings or both of said step portion openings of said adjacent joining ends; wherein only one fastener passes through said step portions of said adjacent joining ends; said nut of each fastener such that said section is held firmly in place upon said adjacent bar segments in said lap joint; wherein the oblong bar portion openings and the oblong step portion openings of adjacent joining ends are aligned such that the greatest length of the oblong openings are aligned with the greatest length of the bar segments; said bolt including a head portion having sufficient size dimensions so that it will not pass into or through any of the openings, a threaded end portion having a circular end portion cross-section, said end portion cross-section having a center, and an oblong shank portion interconnecting said head portion to said threaded end portion, said shank portion having a shank portion cross-section, said shank portion cross-section having a center, said shank portion having sufficient length to extend through an interface between fastener receiving openings when said bolt is received in at least two of said openings, said center of said end portion cross-section being offset from said center of said shank portion cross-section.

9. The sectional sickle bar of claim 8, said special section including edge means for cutting crops.

10. The sectional sickle bar of claim 8 wherein said joining portions of each of said adjacent joining ends abut against the respective shoulder portions of said adjacent joining ends when joining ends of dif-ferent bar segments are joined together in said lap joint.

11. The sectional sickle bar of claim 8, said plurality of bar segments having a length of about six (6) feet or less.

12. The sectional sickle bar of claim 8, each of said nuts being tightened down upon the bolts of the fasteners passing through the two outer section fastener openings of each special section of each lap joint such that said section shares the load across said lap joint.

13. A special fastener for fastening together a plurality stress carrying members, each of the members having an opening for receiving said fastener wherein the openings of said plurality of members can be aligned to receive said fastener simultaneously when the plurality of members overlap one another such that said fastener can fasten them together, said fastener comprising:
   (a) a head portion having sufficient size dimensions so that it will not pass into or through any of the openings;
   (b) a threaded end portion having a circular end portion cross-section, said end portion cross-section having a center,
   (c) an oblong shank portion interconnecting said head portion to said threaded end portion and, said shank portion having a shank portion cross-section, said shank portion cross-section having a center, said shank portion having sufficient length to extend through an interface between fastener receiving openings of at least two of the plurality of members when said fastener is received in openings of at least two of said members;
   (d) a nut having threads which reciprocate and which are designed to receive the threads of said threaded end portion, said nut being received on said end portion when said nut is fastened to the end portion; said center of said end portion cross-section being offset from said center of said shank portion cross-section.

14. The fastener of claim 13 wherein when said oblong shank portions of two fasteners are received through corresponding oblong openings in a sickle bar device and at least partially through two corresponding oblong openings in a cutting sections, the distance between the centers of the end portion cross-sections of the two fasteners can be varied in order to accommodate different mating members requiring different standard separation distances between said fasteners attaching cutting sections to the sickle bar device and the sickle bar device to a particular mating member; wherein cen-ters of said circular end portion cross-sections of two fasteners attaching one cutting section are separated by about two and one-sixteenth inches when turned outward with respect to one another when occupying adjacent openings in the sickle bar, and about two inches when turned inward in the same respect.

* * * * *